United States Patent
Niranjan et al.

(10) Patent No.: US 9,980,215 B2
(45) Date of Patent: May 22, 2018

(54) SYSTEM AND METHOD FOR ACCESS POINT SELECTION WITH EVOLVED PACKET DATA GATEWAY

(71) Applicant: Samsung Electronics Co., Ltd., Suwon-si, Gyeonggi-do (KR)

(72) Inventors: Niranjan, Garland, TX (US); Shu Wang, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 83 days.

(21) Appl. No.: 14/715,032

(22) Filed: May 18, 2015

(65) Prior Publication Data

US 2016/0345256 A1 Nov. 24, 2016

(51) Int. Cl.
| | | |
|---|---|---|
| *H04W 48/20* | (2009.01) | |
| *H04W 36/30* | (2009.01) | |
| *H04W 12/04* | (2009.01) | |
| *H04W 36/06* | (2009.01) | |
| *H04W 48/18* | (2009.01) | |
| *H04W 88/08* | (2009.01) | |
| *H04W 88/16* | (2009.01) | |
| *H04W 48/00* | (2009.01) | |
| *H04L 29/06* | (2006.01) | |

(52) U.S. Cl.
CPC .......... *H04W 48/20* (2013.01); *H04W 36/06* (2013.01); *H04W 36/30* (2013.01); *H04W 48/18* (2013.01); *H04L 63/0272* (2013.01); *H04L 63/164* (2013.01); *H04W 12/04* (2013.01); *H04W 48/17* (2013.01); *H04W 88/08* (2013.01); *H04W 88/16* (2013.01)

(58) Field of Classification Search
CPC ..... H04W 36/06; H04W 48/18; H04W 12/04; H04W 36/30; H04W 48/20; H04W 88/08; H04W 88/16
See application file for complete search history.

(56) References Cited

U.S. PATENT DOCUMENTS

| | | | |
|---|---|---|---|
| 9,319,943 B2* | 4/2016 | Lee | |
| 2007/0249291 A1* | 10/2007 | Nanda | H04W 36/0083 455/73 |
| 2011/0261787 A1* | 10/2011 | Bachmann | H04L 63/029 370/331 |
| 2013/0039275 A1 | 2/2013 | Patil et al. | |

(Continued)

OTHER PUBLICATIONS

Extended European Search Report dated Oct. 11, 2016 in connection with European Application No. 16169962.4, 13 pages.
Foreign Communication from Related Counterpart Application; European Patent Application No. 16169962.4; European Office Action dated Jul. 14, 2017; 12 pages.

(Continued)

*Primary Examiner* — Gbemileke J Onamuti

(57) ABSTRACT

A method, apparatus, and user equipment for wireless communication using evolved data packet gateway (ePDG) communication. The method includes identifying one or more wireless access points and a received signal strength indication for each of the one or more wireless access points. The method also includes identifying which of the one or more wireless access points supports ePDG communication. The method also includes selecting a wireless access point of the one or more wireless access points based on the received signal strength indication and whether the wireless access point supports ePDG communication. The method also includes connecting to an ePDG server through the wireless access point.

17 Claims, 7 Drawing Sheets

(56) References Cited

U.S. PATENT DOCUMENTS

2015/0117425 A1    4/2015   Gupta
2016/0183085 A1*   6/2016   Yerrabommanahalli ..................
                                                        H04W 12/04
                                                           713/153

OTHER PUBLICATIONS

Communication pursuant to Article 94(3) EPC dated Dec. 13, 2017 in connection with European Patent Application No. 16 169 962.4.

* cited by examiner

SYSTEM AND METHOD FOR ACCESS POINT SELECTION WITH EVOLVED PACKET DATA GATEWAY

TECHNICAL FIELD

The present application relates generally to a communication system and, more specifically, to accessing an evolved Packet Data Gateway (ePDG).

BACKGROUND

Handover refers to a procedure which forwards a call signal from one base station to another base station as a user moves beyond a range or network software resets call path. A handover includes seamless and non-seamless handover. A seamless handover includes continuously maintaining a call.

According to an existing handover scheme between the LTE network and the non-3GPP, a user equipment (UE) performs connection with a target network without preliminary preparation for handover. Many carriers are deploying an evolved Packet Data Gateway (ePDG) to support IP Multimedia Subsystem (IMS) services (voice, video, rich communication services, and the like) and operator specific services. The services are comparable to what is deployed already in LTE network. The main function of the ePDG is to secure the data transmission with a UE connected to the evolved packet core (EPC) over an untrusted non-3GPP access. For this purpose, the ePDG acts as a termination node of IPsec tunnels established with the UE.

SUMMARY

A first embodiment of this disclosure provides an apparatus for wireless communication using evolved data packet gateway (ePDG) communication. The apparatus includes a memory element and processing circuitry coupled to the memory element. The processing circuitry is configured to identify one or more wireless access points and a received signal strength indication for each of the one or more wireless access points. The processing circuitry is configured to identify which of the one or more wireless access points supports ePDG communication. The processing circuitry is configured to select a wireless access point of the one or more wireless access points based on the received signal strength indication and whether the wireless access point supports ePDG communication. The processing circuitry is configured to connect to an ePDG server through the wireless access point.

A second embodiment of this disclosure provides user equipment (UE) for wireless communication using evolved data packet gateway (ePDG) communication. The UE includes one or more transceivers and processing circuitry. The one or more transceivers comprising a first transceiver configured to communicate with at least one base station and a second transceiver configured to communicate with at least one wireless access point by transmitting and receiving radio frequency signals with the at least one base station and the at least one wireless access point. The processing circuitry is configured to identify one or more wireless access points and a received signal strength indication for each of the one or more wireless access points. The processing circuitry is configured to identify which of the one or more wireless access points supports ePDG communication. The processing circuitry is configured to select a wireless access point of the one or more wireless access points based on the received signal strength indication and whether the wireless access point supports ePDG communication. The processing circuitry is configured to connect to an ePDG server through the wireless access point.

A third embodiment of this disclosure provides a method for wireless communication using evolved data packet gateway (ePDG) communication. The method includes identifying one or more wireless access points and a received signal strength indication for each of the one or more wireless access points. The method also includes identifying which of the one or more wireless access points supports ePDG communication. The method also includes selecting a wireless access point of the one or more wireless access points based on the received signal strength indication and whether the wireless access point supports ePDG communication. The method also includes connecting to an ePDG server through the wireless access point.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
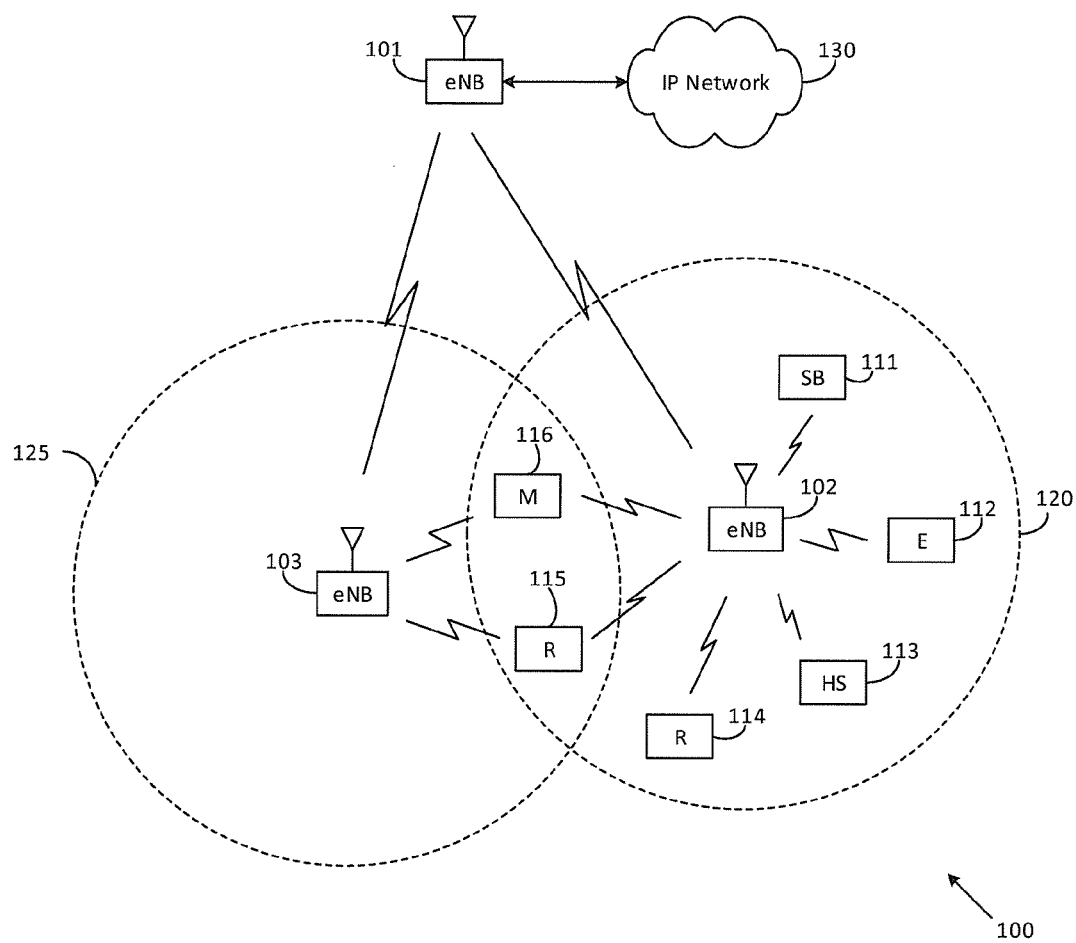
FIG. 1 illustrates an example wireless network according to various embodiments of this disclosure.

FIG. 1 illustrates an example wireless network 100 according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a base station 102, and a base station 103. In one example embodiment, the base stations 101-103 can each be an eNodeB (eNB). The base stations 101-103 communicate with at least one Internet Protocol (IP) network 130, such as the Internet, a proprietary IP network, or other data network.

The base station 102 provides wireless broadband access to the network 130 for a first plurality of user equipments (UEs) within a coverage area 120 of the base station 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The base station 103 provides wireless broadband access to the network 130 for a second plurality of UEs within a coverage area 125 of the base station 103. The second plurality of UEs includes the UE 115 and the UE 116. In some embodiments, one or more of the base station s 101-103 may communicate with each other and with the UEs 111-116 using 5G, LTE, LTE-A, WiMAX, WiFi, or other wireless communication techniques.

Depending on the network type, other well-known terms may be used instead of "base station," such as "eNodeB," "eNB" or "access point." For the sake of convenience, the terms "base station" is used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with BS s, such as the coverage areas 120 and 125, may have other shapes, including irregular shapes, depending upon the configuration of the BS s and variations in the radio environment associated with natural and man-made obstructions.

Although FIG. 1 illustrates one example of a wireless network 100, various changes may be made to FIG. 1. For example, the wireless network 100 could include any number of BS s and any number of UEs in any suitable arrangement. Also, the BSs 101-103 could communicate directly with any number of UEs and provide those UEs with wireless broadband access to the network 130. Further, the BS 101, 102, and/or 103 could provide access to other or additional external networks, such as external telephone networks or other types of data networks.

Figure 2:
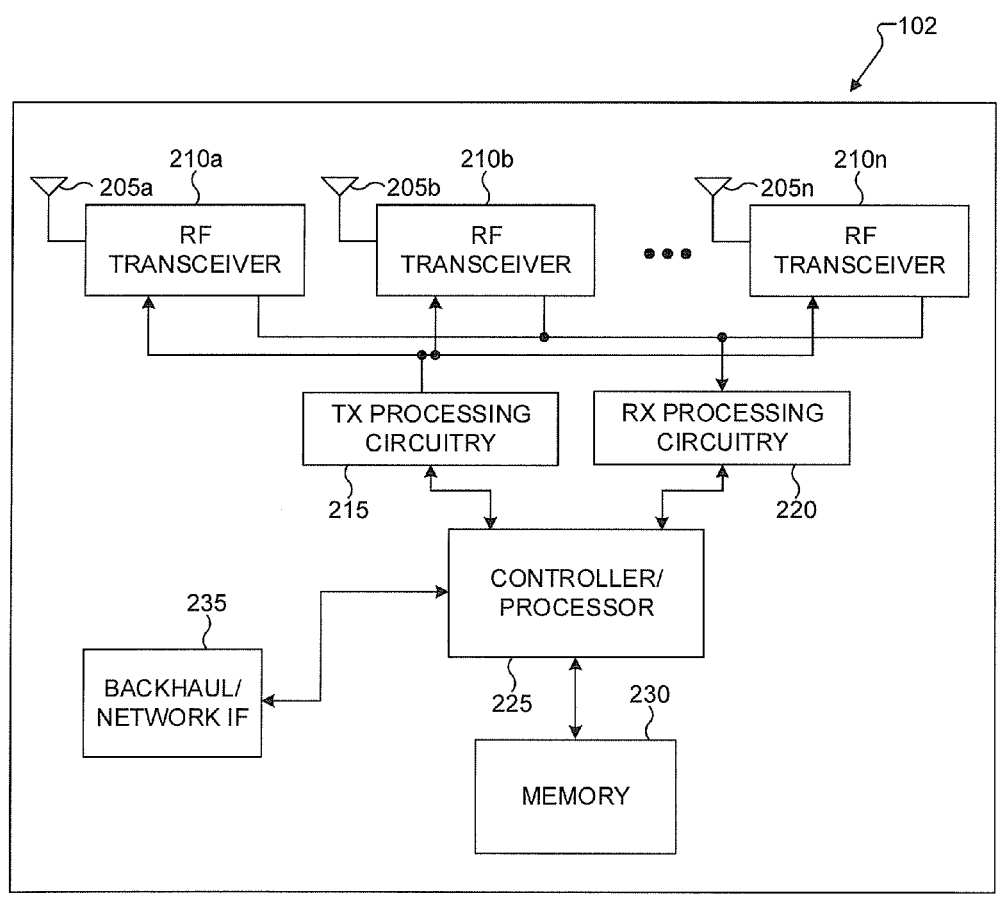
FIG. 2 illustrates an example base station (BS) according to various embodiments of this disclosure.

FIG. 2 illustrates an example BS 102 according to various embodiments of this disclosure. The embodiment of the BS 102 illustrated in FIG. 2 is for illustration only, and the BS s 101 and 103 of FIG. 1 could have the same or similar configuration. However, BS s come in a wide variety of configurations, and FIG. 2 does not limit the scope of this disclosure to any particular implementation of an BS.

As shown in FIG. 2, the BS 102 includes multiple antennas 205a-205n, multiple RF transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the BS 102 to communicate with other devices or systems over a backhaul connection or over a network. The interface 235 could support communications over any suitable wired or wireless connection(s). For example, when the BS 102 is implemented as part of a cellular communication system (such as one supporting 5G, LTE, or LTE-A), the interface 235 could allow the BS 102 to communicate with other BS over a wired or wireless backhaul connection. When the BS 102 is implemented as an access point, the interface 235 could allow the BS 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

Figure 3:
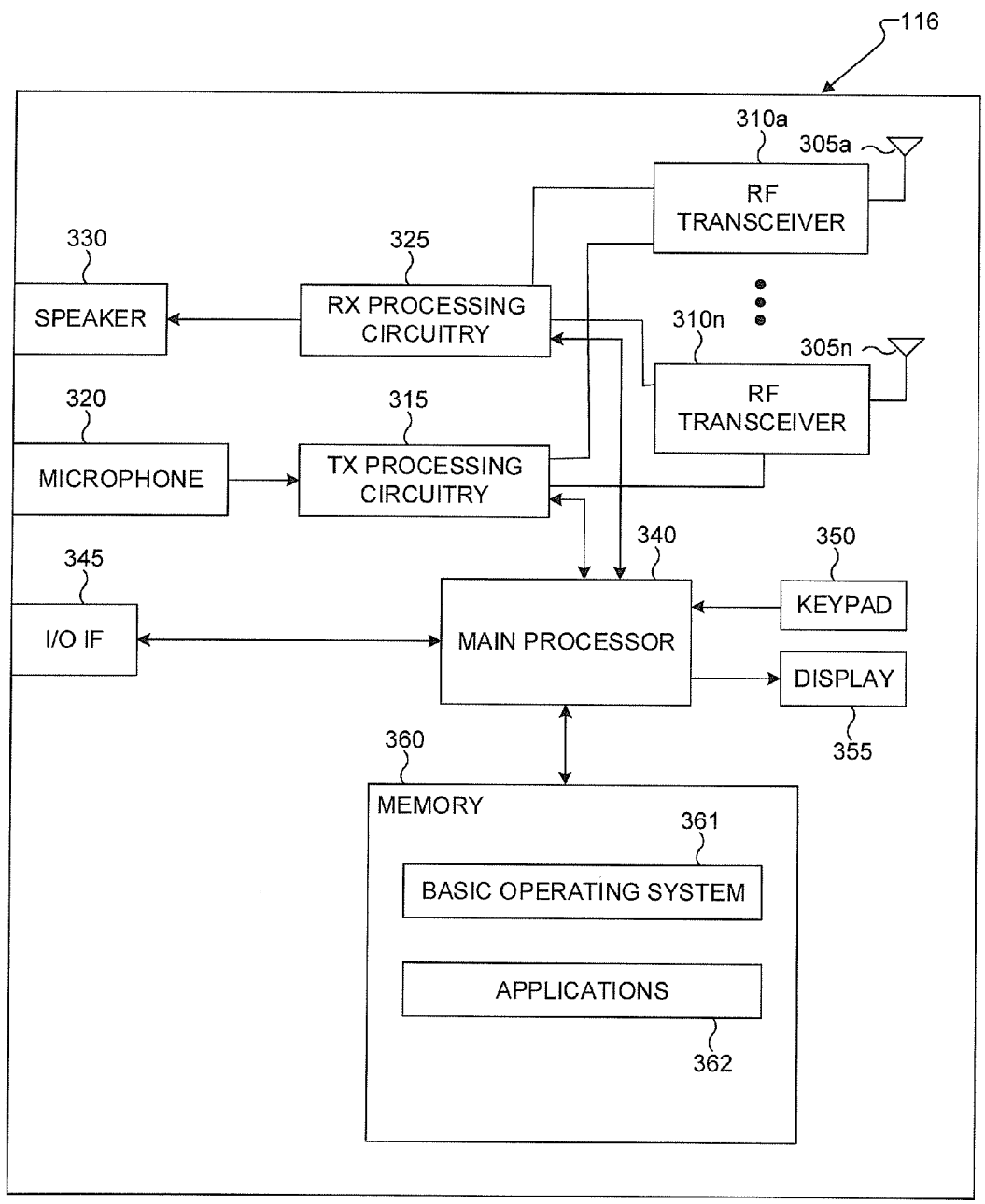
FIG. 3 illustrates an example user equipment (UE) according to various embodiments of this disclosure.

FIG. 3 illustrates an example UE 116 according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an BS of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The RF transceiver 310 can include different RF receives 310a-n. Each RF transceiver 310a-n can communicate over a different network. For example, but not limited to, near field communication networks, local area networks, wide local area networks, and the like. An RF transceiver can be configured to communicate over one networks or more than one network.

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from BSs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Various embodiments of this disclosure recognize and take into account that current non-hotspot 2.0 supported Wi-Fi access points (AP) are not able to broadcast ePDG capability. Many publicly deployed Wi-Fi APs do not support ePDG Internet Key Exchange (IKE) message pass-through due to firewall policy that causes ePDG connection/handover failure. Current methodologies for a UE to select Wi-Fi APs are primarily Received Signal Strength Indication (RSSI) signal based and do not check or consider ePDG connection capability on an AP.

Various embodiments of this disclosure recognize and take into account that a UE can ping the ePDG Gateway to check the reachability of ePDG Gateway. A ping uses Internet Control Message Protocol (ICMP) protocol and does not use IKE protocol. This approach is not able to check on ePDG IKE pass-through capability of the Wi-Fi AP. Dead Peer Detection is defined to check ePDG Gateway capabilities when an existing tunnel is established. None of these methods help to discover which APs support ePDG capability.

Various embodiments of this disclosure recognize and take into account that Wi-Fi AP selection without checking ePDG support capability can lead to an undesirable user experience. For example, during an E911 call over LTE, if the LTE signal becomes weak, the UE can handover the E911 call to a Wi-Fi+ePDG system. Since the UE is not able to detect if a Wi-Fi AP supports ePDG connection capability in advance, the UE may handover to a non-ePDG supported Wi-Fi AP. This will result in ePDG handover failure and can discontinue the E911 call. The disruption and waste of time during an E911 call can have undesirable consequences to the reason for the call. If a mobile user is in a Wi-Fi only area, and there are two Wi-Fi APs (AP1 does not supports ePDG and RSSI level is the strongest; AP2 support ePDG, but RSSI is not as strong as AP1). If the UE connects based on RSSI, The UE will connect to AP1 and not be able to establish ePDG connection due to AP1's limitation (no ePDG support) and is not able to make Voice over Wi-Fi (VoWi-Fi) or Video over Wi-Fi (VideoOverWi-Fi) call. If the UE had connected based on ePDG capability, the UE would connect to AP2 an make VoWi-Fi and VideoOverWi-Fi call. During ePDG connection, a difficulty is to discover APs which support ePDG connection capability.

Figure 4:
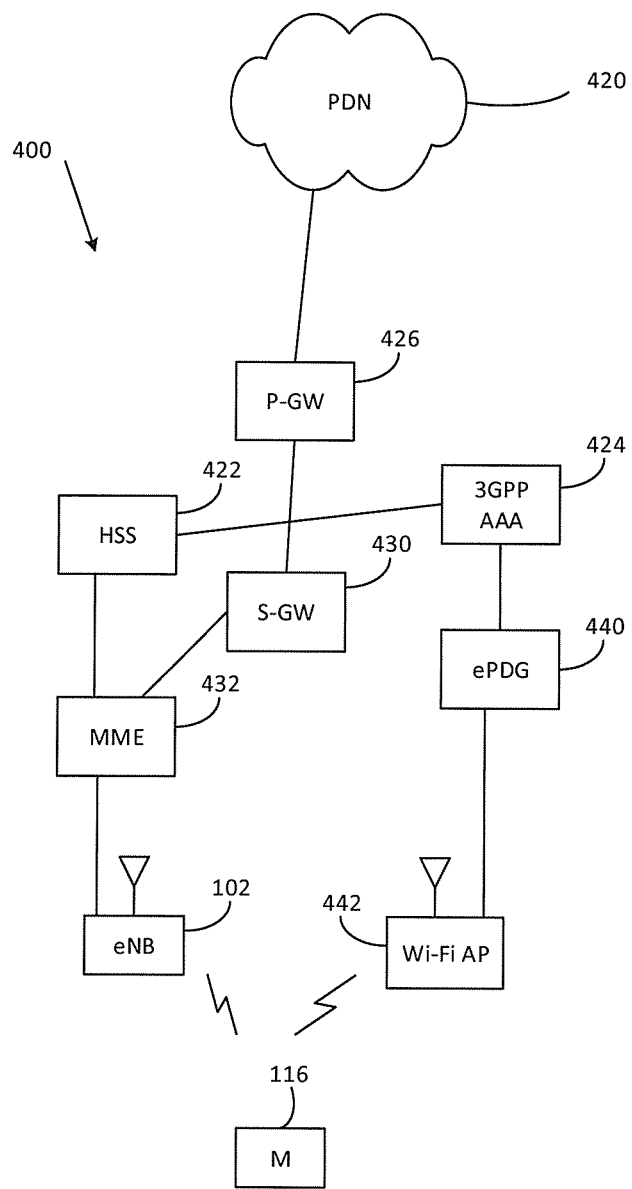
FIG. 4 illustrates an example wireless network with an evolved Packet Data Gateway (ePDG) according to various embodiments of this disclosure.

FIG. 4 illustrates an example wireless network 400 with an evolved Packet Data Gateway (ePDG) 440 according to various embodiments of this disclosure. The embodiment of the wireless network 400 shown in FIG. 4 is for illustration only. Other embodiments of the wireless network 400 could be used without departing from the scope of this disclosure.

In FIG. 4, the wireless network 400 includes UE 116, a Packet Data Network (PDN) 420, a Home Subscriber Server (HSS) 422, a 3GPP (Authentication, Authorization and Accounting (AAA) 424, PDN-gateway (P-GW) 426, a Serving Gateway (S-GW) 430, a Mobility Management Entity (MME) 432, a base station (BS) 102, the evolved Packet Data Gateway (ePDG) 440 and a Wireless Fidelity Access Point (Wi-Fi AP) 442. The wireless network 400 can work in cooperation and as part of wireless network 100 as shown in FIG. 1.

In an embodiment of this disclosure, the UE 116 receives data from the PDN 420 through the P-GW 426, the S-GW 430, and the BS 102, and transmits data to the PDN 420. When connection state with the BS 102 becomes weak, the UE 116 handovers to the Wi-Fi AP 442. The UE 116 communicates with the 3GPP AAA server 424 to perform authentication. If the authentication is successfully performed, in an example using Proxy Mobile IPv6 (PMIPv6) protocol, the ePDG 440 transmits a Proxy Binding Update (PBU) message to the P-GW 426. The PBU message is a message for requesting that a path directing to the UE 116 be changed. The P-GW 426 having received the PBU message changes a path directing to the UE 116 and transmits a Proxy Binding Acknowledge (PBA) message to the ePDG 440 as a response with respect to the PBU message.

According to another embodiment, the ePDG 440 can be connected to the P-GW 426 through a General packet radio service Tunneling Protocol (GTP) path instead of a PMIPv6 path. In this example, the ePDG 440 transmits a Create Session Request message instead of the PBU to the P-GW 426 and receives a Create Session Response message from the P-GW 426 to open a GTP path.

Although FIG. 4 illustrates one example of UE 116, various changes may be made to FIG. 4. For example, various components in FIG. 4 could be combined, further subdivided, or omitted and additional components could be added according to particular needs. As a particular example, while FIG. 4 illustrates the UE 116 configured as a mobile telephone or smartphone, UEs could be configured to operate as other types of mobile or stationary devices.

Figure 5:
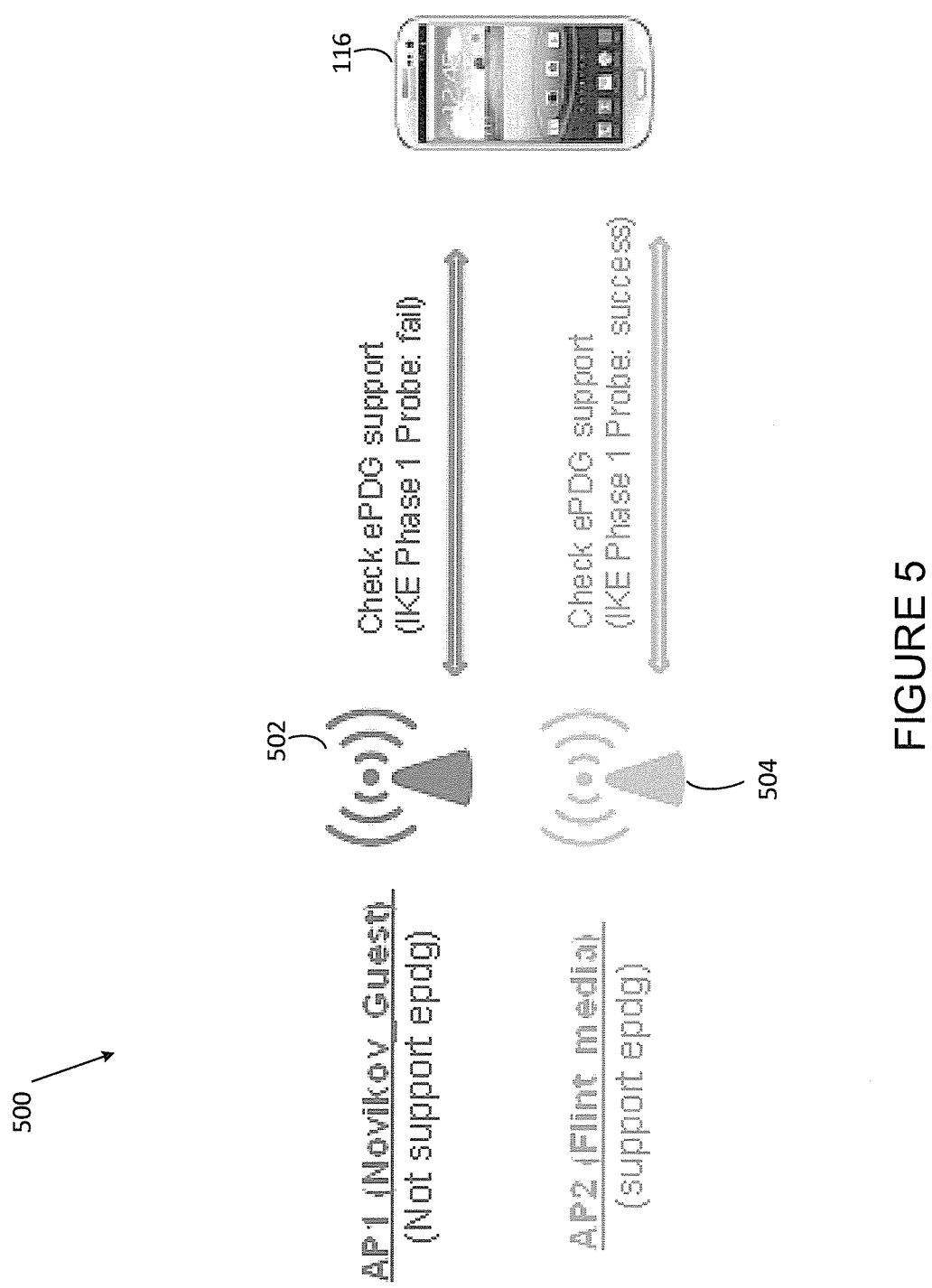
FIG. 5 illustrates an example selection process for access points according to various embodiments of this disclosure.

FIG. 5 illustrates an example selection process 500 for access points according to various embodiments of this disclosure. The embodiment of the selection process 500 shown in FIG. 5 is for illustration only. Other embodiments of the selection process 500 could be used without departing from the scope of this disclosure.

One or more embodiments of this disclosure provide a new method for UE to discover Wi-Fi APs which give higher priority to AP with ePDG connection capability. During Wi-Fi AP selection, a UE 116 checks ePDG connection capability for Wi-Fi APs and selects the Wi-Fi AP based on both ePDG connection capability and RSSI signal strength.

In the selection process 500, the UE 116 can choose a Wi-Fi AP SSID with strongest signal, associate to the AP, and check ePDG connection support. In FIG. 5, AP1 502 has the strongest signal, but fails an IKE Phase 1 probe. The UE can associate with next strongest signal AP, AP2 504 if the first one does not support an ePDG connection. In FIG. 5, AP2 504 passes an IKE Phase 1 probe. If AP2 did not support an ePDG connection, the UE 116 could continue through APs until an ePDG supported AP is reached.

The UE 116 first connects to Wi-Fi AP1 502 with the strongest RSSI signal. After ePDG connection checking, the UE 116 finds AP1 502 does not support ePDG. The UE 116 auto disassociates with AP1 502 and connects to the next strongest RSSI signal AP which is AP2 504 and checks for ePDG support. Since AP2 504 supports ePDG, the UE 116 can select AP2 504 for the Wi-Fi connection.

Figure 6:
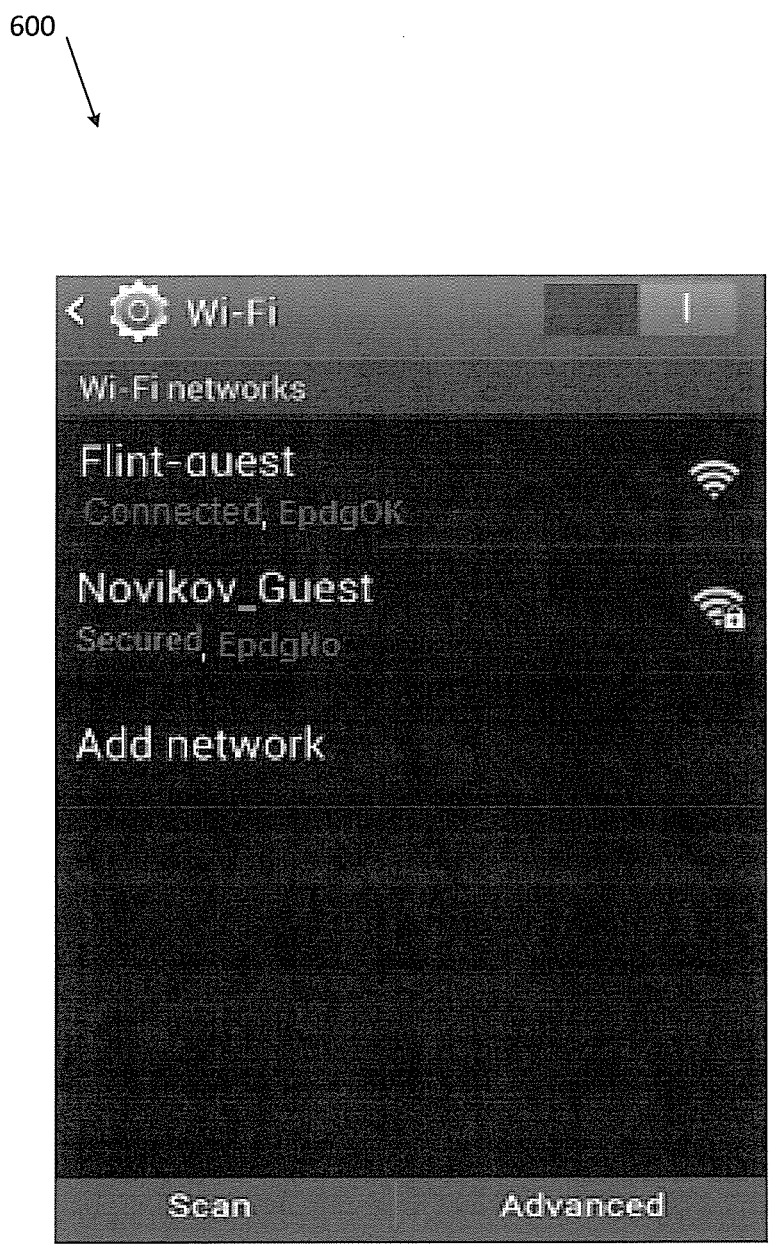
FIG. 6 illustrates an example Wi-Fi AP list according to various embodiments of this disclosure.

FIG. 6 illustrates an example Wi-Fi AP list 600 according to various embodiments of this disclosure. The embodiment of the list 600 shown in FIG. 6 is for illustration only. Other embodiments of the list 600 could be used without departing from the scope of this disclosure.

In FIG. 6, when 3GPP (e.g. 4G) to ePDG handover is needed (e.g. 4G signal is too weak and WIFI signal is strong), the UE handovers to the Wi-Fi AP that is ePDG optimized (known to be ePDG connection compatible). The UE will do handoff to Flint-guest AP which is ePDG supported and support seamless 4G to ePDG handoff. The Wi-Fi APs that support ePDG can be identified in the list of Wi-FI APs.

Figure 7:
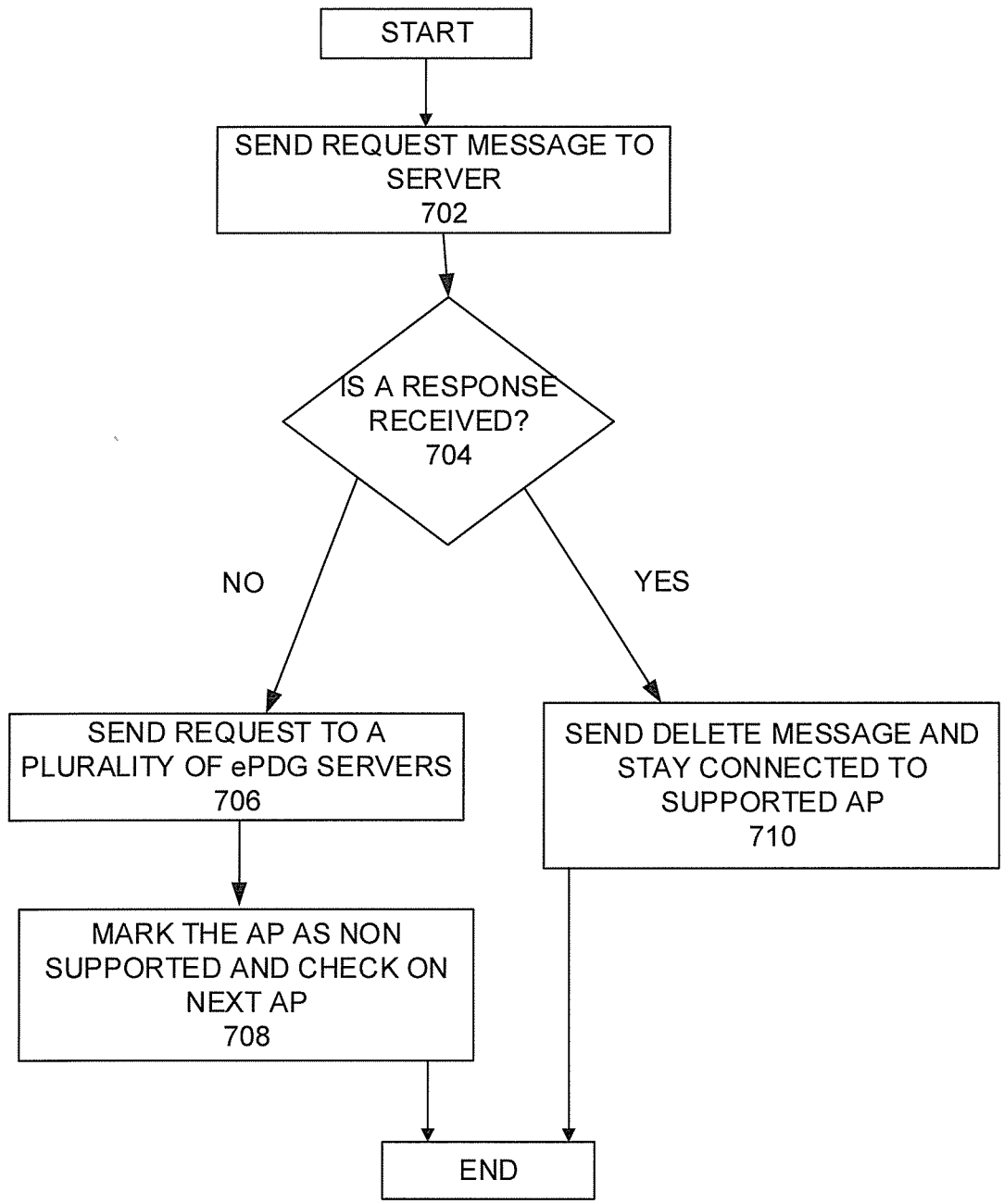
FIG. 7 illustrates an example process for checking ePDG connection compatibility according to various embodiments of this disclosure.

FIG. 7 illustrates an example process 700 for checking ePDG connection compatibility according to various embodiments of this disclosure. The embodiment of the process 700 shown in FIG. 7 is for illustration only. Other embodiments of the process 700 could be used without departing from the scope of this disclosure.

To check if a Wi-Fi AP supports an ePDG connection, process 700 uses partial IKE procedures (IKE Phase 1). At operation 702, the UE sends an IKE Phase 1 request message or probe (IKE_SA_INIT Request) to the ePDG server. The request message can be referred to as an IKE initialization request.

If a Wi-Fi AP supports ePDG capability, the AP can pass the IKE message to the ePDG server and the ePDG server can send IKE Phase 1 reply message back to UE. If the AP does not support ePDG capability, the AP can block the IKE message and UE will not receive IKE Phase 1 reply message. The reply message can be referred to as an IKE initialization response.

The ePDG server can be one of multiple ePDG servers. To determine whether the ePDG server is down or whether the Wi-Fi AP does not support ePDG capability, the UE can send another IKE initialization request through the Wi-Fi AP to another ePDG server. IKE initialization requests can be sent until a predetermined number of or all of the ePDG servers have failed to respond. Once a predetermined number or all is reached, the Wi-Fi AP can be listed as not supporting ePDG capability. The UE can obtain a list of ePDG servers from a domain name system (DNS) search or the UE can have the ePDG servers already stored.

To determine whether a response is received, the UE can wait for a timeout period of time before acknowledging that reply message will not be received and either marking the Wi-Fi AP as not supportive of ePDG capability, or moving to another ePDG server.

At operation 704, the UE can determine whether a response is received. If UE does not receive IKE Phase 1 response, at operation 706, the UE can retry or simultaneously send IKE Phase 1 requests to two or more various ePDG servers (the UE can have a list of ePDG server addresses). If the requests to various ePDG servers also fail, it implies Wi-Fi AP is blocking the IKE traffic and, at operation 708, the UE will mark the Wi-Fi AP as ePDG non-supported and check on a next Wi-Fi AP.

If the UE receives an IKE Phase 1 response message (IKE_SA_INIT Response) from the ePDG server, then it means the selected AP supports ePDG connection. At operation 710, the device sends a DELETE message to clean up the IKE SA tunnel. The UE stays connected with the ePDG supported Wi-Fi AP.

In another embodiment, the UE can perform a check of all available Wi-Fi APs to identify which support ePDG connection in advance of a handover. Once the Wi-Fi APs that support ePDG connection are identified, the UE can change an indicator or display an indicator that each Wi-Fi AP supports ePDG.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus, comprising:
a memory element; and
processing circuitry coupled to the memory element, the processing circuitry configured to:
identify one or more wireless access points and a received signal strength indication for each of the one or more wireless access points;
send internet key exchange (IKE) initialization requests to an evolved data packet gateway (ePDG) server sent through each of the one or more wireless access points;
identify which of the one or more wireless access points supports ePDG communication based on which of the one or more wireless access points provides an IKE initialization response to the IKE initialization requests;
select a wireless access point of the one or more wireless access points based on the received signal strength indication and whether the wireless access point supports ePDG communication; and
connect to an ePDG server through the wireless access point.

2. The apparatus of claim 1, wherein the processing circuitry configured to determine whether the wireless access point supports ePDG communication comprises the processing circuitry configured to:
determine whether an IKE initialization response is received before a timeout period is satisfied; and
responsive to receiving the IKE initialization response before the timeout period, identify the wireless access point as supporting ePDG communication.

3. The apparatus of claim 2, further comprising the processing circuitry configured to:
responsive to the timeout period being satisfied before the IKE initialization response is received, (i) indicate the wireless access point as not supportive of ePDG communication or (ii) send another IKE initialization request to another ePDG server of the one or more ePDG servers.

4. The apparatus of claim 1, wherein the processing circuitry configured to select the wireless access point of the one or more wireless access points based on the received signal strength indication and whether the wireless access point supports ePDG communication comprises processing circuitry configured to select the wireless access point supporting ePDG communication with a strongest received signal strength indication.

5. The apparatus of claim 1, wherein the processing circuitry configured to connect to the ePDG server through the wireless access point comprises processing circuitry configured to seamlessly transition a cellular communication to an ePDG service for Voice or Video over Wi-Fi.

6. The apparatus of claim 1, wherein the processing circuitry is further configured to control a display to indicate that the wireless access point supports ePDG communication.

7. A user equipment for wireless communication, comprising:
one or more transceivers comprising a first transceiver configured to communicate with at least one base station and a second transceiver configured to communicate with at least one wireless access point by transmitting and receiving radio frequency signals with the at least one base station and the at least one wireless access point; and
processing circuitry configured to:
identify one or more wireless access points of the at least one wireless access point and a received signal strength indication for each of the one or more wireless access points;
send internet key exchange (IKE) initialization requests to an evolved data packet gateway (ePDG) server sent through each of the one or more wireless access points;
identify which of the one or more wireless access points supports ePDG communication based on which of the one or more wireless access points provides an IKE initialization response to the IKE initialization requests;
select a wireless access point of the one or more wireless access points based on the received signal strength indication and whether the wireless access point supports ePDG communication; and
connect, through the second transceiver, to an ePDG server through the wireless access point.

8. The user equipment of claim 7, wherein the processing circuitry configured to determine whether the wireless access point supports ePDG communication comprises the processing circuitry configured to:
determine whether an IKE initialization response is received before a timeout period is satisfied; and responsive to receiving the IKE initialization response before the timeout period, identify the wireless access point as supporting ePDG communication.

9. The user equipment of claim 8, further comprising the processing circuitry configured to:
responsive to the timeout period being satisfied before the IKE initialization response is received, (i) indicate the wireless access point as not supportive of ePDG communication or (ii) send another IKE initialization request to another ePDG server of the one or more ePDG servers.

10. The user equipment of claim 7, wherein the processing circuitry configured to select the wireless access point of the one or more wireless access points based on the received signal strength indication and whether the wireless access point supports ePDG communication comprises processing circuitry configured to select the wireless access point supporting ePDG communication with a strongest received signal strength indication.

11. The user equipment of claim 7, wherein the processing circuitry configured to connect to the ePDG server through the wireless access point for comprises processing circuitry configured to seamlessly transition a cellular communication to an ePDG service for Voice or Video over Wi-Fi.

12. The user equipment of claim 7, wherein the processing circuitry is further configured to control a display to indicate that the wireless access point supports ePDG communication.

13. A method for wireless communication using evolved data packet gateway (ePDG) communication, the method comprising:
identifying one or more wireless access points and a received signal strength indication for each of the one or more wireless access points;
sending internet key exchange (IKE) initialization requests to an ePDG server sent through each of the one or more wireless access points;
identifying which of the one or more wireless access points supports ePDG communication based on which of the one or more wireless access points provides an IKE initialization response to the IKE initialization requests;
selecting a wireless access point of the one or more wireless access points based on the received signal strength indication and whether the wireless access point supports ePDG communication; and
connecting to an ePDG server through the wireless access point.

14. The method of claim 13, wherein determining whether the wireless access point supports ePDG communication comprises:
determining whether an IKE initialization response is received before a timeout period is satisfied; and
responsive to receiving the IKE initialization response before the timeout period, identifying the wireless access point as supporting ePDG communication.

15. The method of claim 14, further comprising:
responsive to the timeout period being satisfied before the IKE initialization response is received, (i) indicating the wireless access point as not supportive of ePDG communication or (ii) sending another IKE initialization request to another ePDG server of the one or more ePDG servers.

16. The method of claim 13, wherein selecting the wireless access point of the one or more wireless access points based on the received signal strength indication and whether the wireless access point supports ePDG communication comprises selecting the wireless access point supporting ePDG communication with a strongest received signal strength indication.

17. The method of claim 13, wherein connecting to the ePDG server through the wireless access point comprises seamlessly transitioning a cellular communication to an ePDG service for Voice or Video over Wi-Fi.

* * * * *